United States Patent
MacDougall (10) Patent No.: US 6,168,174 B1
(45) Date of Patent: Jan. 2, 2001

(54) GOLF BAG PUSH CART

(75) Inventor: Alexander Stewart MacDougall, 495 Valley Club Rd., Santa Barbara, CA (US) 93108

(73) Assignee: Alexander Stewart MacDougall, Santa Barbara, CA (US)

( * ) Notice: Under 35 U.S.C. 154(b), the term of this patent shall be extended for 0 days.

(21) Appl. No.: 09/245,801

(22) Filed: Feb. 5, 1999

Related U.S. Application Data (63) Continuation-in-part of application No. 08/991,914, filed on Dec. 16, 1997, now abandoned.

(51) Int. Cl.[7] .................................................. B62B 3/00
(52) U.S. Cl. .................. 280/47.34; 280/659; 280/DIG. 6
(58) Field of Search .................................. 280/645, 651, 280/652, 639, 47.24, 47.25, 47.26, 659, DIG. 6, 47.34, 47.35; 34/5

(56) References Cited

U.S. PATENT DOCUMENTS

| | | | |
|---|---|---|---|
| 3,926,448 | * 12/1975 | Reichard | 280/DIG. 6 |
| 4,062,564 | * 12/1977 | Schimmeger | 280/DIG. 6 |
| 5,836,601 | * 11/1998 | Nelson | 280/DIG. 6 |
| 5,899,284 | * 5/1999 | Reimers | 280/DIG. 6 |

* cited by examiner

Primary Examiner—Richard M. Camby
(74) Attorney, Agent, or Firm—Marvin E. Jacobs (57) ABSTRACT

The cart is formed of a lightweight, rearwardly and upwardly inclined frame members having a support for a golf club bag such as a set of spaced tubular members, and a bottom frame. The bottom end of the inclined frame is pivotally connected to the front end of the bottom frame. A handlebar is connected to the top end of the inclined frame. At least one large wheel is rotatably attached to the front of the bottom frame and at least two wheels having at least the spacing of the front wheel and preferably a larger diameter than the front wheel are rotatably attached to the back end of the bottom frame. The cart is pushed from behind, rides very smoothly and is stable on uneven terrain and stands unassisted on its wheels when stopped. Rotatable connection of the inclined frame to the bottom frame permits the golf cart to be folded to a compact configuration which can be stored in a flat, elongated rectangular bag.

21 Claims, 8 Drawing Sheets

GOLF BAG PUSH CART

CROSS-REFERENCE TO RELATED APPLICATION

This is a continuation-in-part application of application Ser. No. 08/991,914 filed Dec. 16, 1997 now abandoned.

TECHNICAL FIELD

The present invention relates to a golf bag cart which is used to transport golf clubs, and more particularly a light weight, foldable golf bag cart that is pushed by the golfer.

BACKGROUND OF THE INVENTION

Many devices exist for the transport of golf clubs. Many of these are motorized, the most common being the four wheeled lead acid battery powered riding cart for the transport of not only the golf bag and its clubs but also the golfer. These carts weigh several hundred pounds. Other golf carts are designed to transport just the golf bag and its clubs but are also powered, for example Oakes (U.S. Pat. No. 4,570,731). This device has three wheels, is foldable but with a sizable and comparatively heavy frame structure to support the weight of the motor and its source of power. The electrically powered three wheeled golf cart by Rolland (U.S. Pat. No. 3,605,929) is designed to transport one rider and his or her golf bag and clubs. It is designed for easy disassembly for transport, however it also must have a strong frame and structure to support the motor and its power source. In addition, adding to its weight and bulk, the frame of this device has a provision to maintain the battery in an upright position irrespective of the orientation of the cart frame to reduce hazards during its transport.

Delserro (U.S. Pat. No. 5,468,006) describes a three wheeled riding cart with a pedal assembly that is mechanically coupled to a shaft to which a pair of spaced rear wheels are attached. A two wheeled unpowered golf cart by Bridges (U.S. Pat. No. 5,470,095) uses two wheel assemblies which are attached to the bottom portion of a semi-rigid golf bag. The cart, bags and clubs are pulled by a handle deployable from the open portion of the bag. In a similar matter, a leg can be deployed from the bottom of the bag for supporting the golf bag in an upright position when it is parked or stored.

Figure 9:
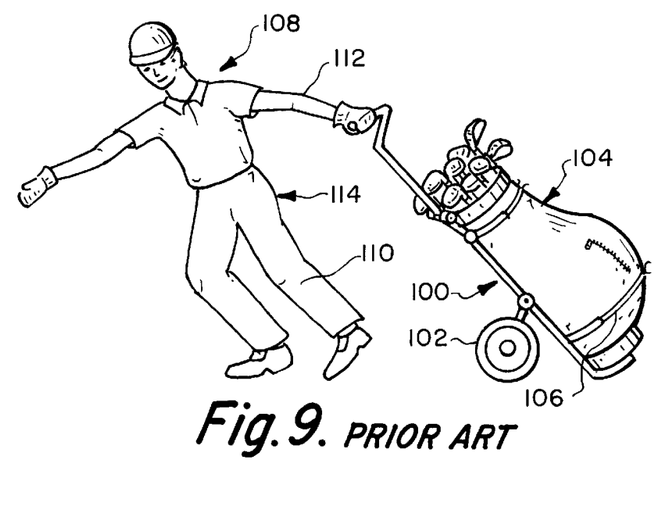
FIG. 9 is a schematic view of a prior art, two wheeled pull-type golf cart.

In addition to the cart by Bridges an extensive variety of two wheel, unpowered golf bag carts exist, all of which are pulled by the golfer. With only two wheels, additional means must be provided to balance the carts when they are stopped and unattended. Typically they are fitted with one or two leg stands just behind the two wheels. Referring now to FIG. 9, in order to move the cart 100 to its next destination, the legs must be lifted above the terrain by tilting the cart back on its wheels 102. Other carts integrate the wheels and leg stands with the golf bag. Because of the tilting and instability of two wheeled carts, means of attaching golf bags are required, usually a variety of clamps, straps, buckles and snaps.

All of these approaches have limitations and serious disadvantages for the golfer. The powered carts are heavy, expensive and not readily transportable. They also suffer from potential safety problems associated with their use of batteries and their massive weight. The golf bags 104 for two wheeled pulled carts must be strapped to the cart to prevent the bag from falling off during the pulling operation. In addition, placing two wheeled carts in the upright position is often a difficult balancing act and if done improperly, the cart and bag will fall. Doctors place much of the blame on back problems from pulling a golf cart. The traditional pull cart causes unusual strain on the shoulder and back because of the act of pulling weight from behind the body. The balance point of the pull cart with its two wheels is hard to locate and if the handle bar is not properly adjusted, has a tendency to fall handle down or want to return to a upright position causing further strain on your shoulders and arm. The bag over the two wheels has a tendency to fall off the cart causing constant adjustment problems.

More and more people are walking while they play golf. As shown in FIG. 9, all two wheeled carts on the market are designed to be pulled which exposes the golfer 108 to potentially serious, hurtful and damaging strain on his/her arms, torso and lower back. Physicians have realized for decades the potential and real hazards to backs, shoulders and arms caused by pulling objects. Harm to shoulders, backs and especially the back's lumbar area can be caused not only by pulling heavy objects but by pulling even relatively light objects at an uncomfortable, or awkward angle.

Furthermore, in initiating movement of two wheeled carts from their upright, standing position, the golfer is often exposed to unnatural, and potentially threatening, motions of his/her arms and torso. Further compounding the injury problem, most two wheel carts must be balanced at a precise angle while they are being pulled to avoid contact of the legs 110 with golf greens or fairways. This balancing process, also imposes arm 112 and torso 114 movements that place the golfer at risk of muscle strain. This difficult process also increases the effort required to move the cart and clubs, thus excessively fatiguing the golfer.

STATEMENT OF THE INVENTION

The invention overcomes the shortcomings, limitations and potential hazards of prior art pulled golf carts. The invention provides a novel pushable cart to transport a golf bag and its golf clubs. The primary distinction and benefits of such a cart devolve from the fact that the cart is pushed rather than pulled. This design recognizes that people are better appreciating and understanding the health benefits of walking and thus are doing so more and more. This trend also applies to golfing on those golf courses where walking the course is permitted. The cart of this invention is logically and ergonomically designed to increase the comfort and decrease the risk of injury to a golfer while transporting his/her golf clubs. One cannot help but notice many other wheeled conveyance appliances such as grocery carts, wheel barrows, baby strollers, jogging strollers and wheel chairs (when the are not operated by the occupant), that are pushed rather than pulled.

The golf bag push cart of this invention is generally comprised of a light weight, rearwardly and upwardly inclined frame having means to support a golf bag. A plurality of large wheels are attached to the frame. A handle assembly with a handle bar connected to the frame to place the handle bar in a comfortable pushing position for the golfer. One feature of the invention is a handle assembly telescopically adjustable to provide the most comfortable and strain free pushing position for the golfer. Another feature is a lightweight foldable frame that can be carried in a flat bag. The design aesthetics of the cart are such that it presents an attractive, state of the art, "high tech" appearance.

Not only does the cart provide a variable height for the handle bar, but it is designed so that the golfer may push the cart from directly behind the handle bar, or from either side. This provides at least three fundamental positions from which the cart may be pushed to further reduce fatigue and the possibility of muscle strain or injury. In all of the pushing alternatives, the light weight cart moves easily and turns readily on its large wheels.

Having several alternative positions from which to push the cart provides additional ergonomic benefits to the golfer. Most frequently the golfer will push the cart from behind with his/her arms relaxed and slightly extended, and the hands lightly grasping the handle bar which can be padded. When pushing the cart up hills and grades, the arms are extended slightly more to the most comfortable position for the golfer. On level terrain, the freely turning cart wheels provide for nearly effortless movement of the cart. On downslopes, the cart is easily restrained by simply grasping the handle bar which limits the advance of the cart to the walking speed of the golfer.

The stability and balancing problems of two wheeled carts is overcome by this invention by having at least three, relatively large diameter wheels. Two widely spaced wheels (but sufficiently narrow to negotiate doorways) and a single or double front wheel on axle narrower than the rear axle are provided in the preferred embodiment. In addition to the wider spacing of the rear wheels, they also can be cambered with their bottoms more broadly spaced than their tops. This further increases the stability of the cart. The cart of this invention is always fully supported on its wheels thus avoiding the need to balance the cart, or pull it off a stand prior to moving it as is the case with most two wheeled golf carts. The push cart of this invention, with its load of a golf bag and clubs has a very low center of gravity that contributes to its exceptional stability, excellent balance and ideal weight distribution, each contributing to its outstanding ease of operation.

The stability of the push cart and the fact that the cart is never tilted during use obviates the need to strap or otherwise attach the golf bag to the cart. With this invention, any sized golf bag is merely placed in cradles or suspended from the frame with the bottom of the bag resting on a base plate.

Large diameter wheels facilitate the cart's movement and transport over irregular surfaces and minimize damage to greens and fairways. With its balanced, light weight design, the cart quickly turns in its own length with only a slight downward and lateral pressure from the golfer on the padded handle bar.

Preferably, the rear wheels have a larger diameter than the front wheels. Usually, the front wheels have a diameter from 4–10 inches, preferably 6–8 inches. The rear wheels have a diameter from 10 to 20 inches, preferably 12–14 inches. A more stable ride with less effort occurs when the rear wheels are spaced further apart form the front wheels. The front wheels are generally spaced 4–12 inches apart and the real wheels are spaced from 14 to 30 inches apart, preferably 18–24 inches apart. Tires having a tread width of from 1–4 inches, preferably 1.5 to 2.5 inches contribute to the stability and ride of the cart.

A further important feature of this novel cart is the rearward and upward incline of the support member for the golf bag which determines the angle that the clubs are presented to the golfer. The angle (from 40 degrees to 60 degrees, preferably about 50 degrees) is designed to provide convenient, easy and quick removal of the clubs from the bag. Of course, the return of the clubs to the bag is equally straightforward.

For convenient transport and storage, this cart may be readily foldable into a compact configuration. In the preferred embodiment, folding is accomplished by releasing a spring loaded locking pin. Similarly, the cart is returned to its normal position by merely pulling up on the frame until the spring loaded pin automatically locks the rear wheels in their proper position for operation. No tools are required for either process.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
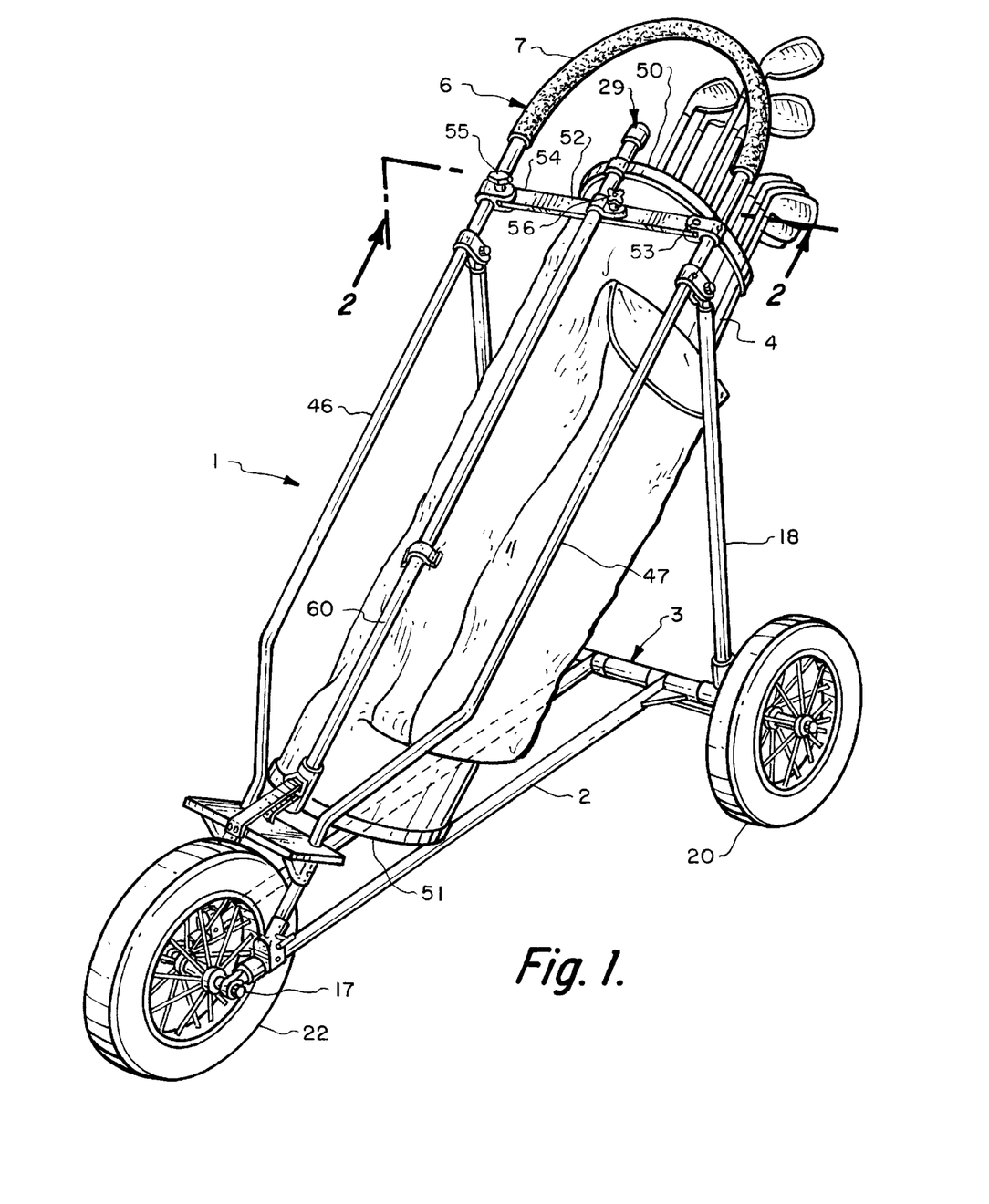
FIG. 1 is an isometric view of a three wheeled version of the golf bag push cart ready for use with the golf bag secured to the cart.

Referring now to FIG. 1, a version a golf bag push cart 1 is shown comprising an inclined frame formed of tublar member 46, 47, a front axle assembly 17, a rear axle assembly 3, rear wheels 20, 21, a handle bar assembly 6, an upright support assembly 18, and means 29 for supporting a golf bag 4. Continuing reference to FIG. 1, the handle bar assembly 6 includes a handle bar 7.

Figures 2, 3:
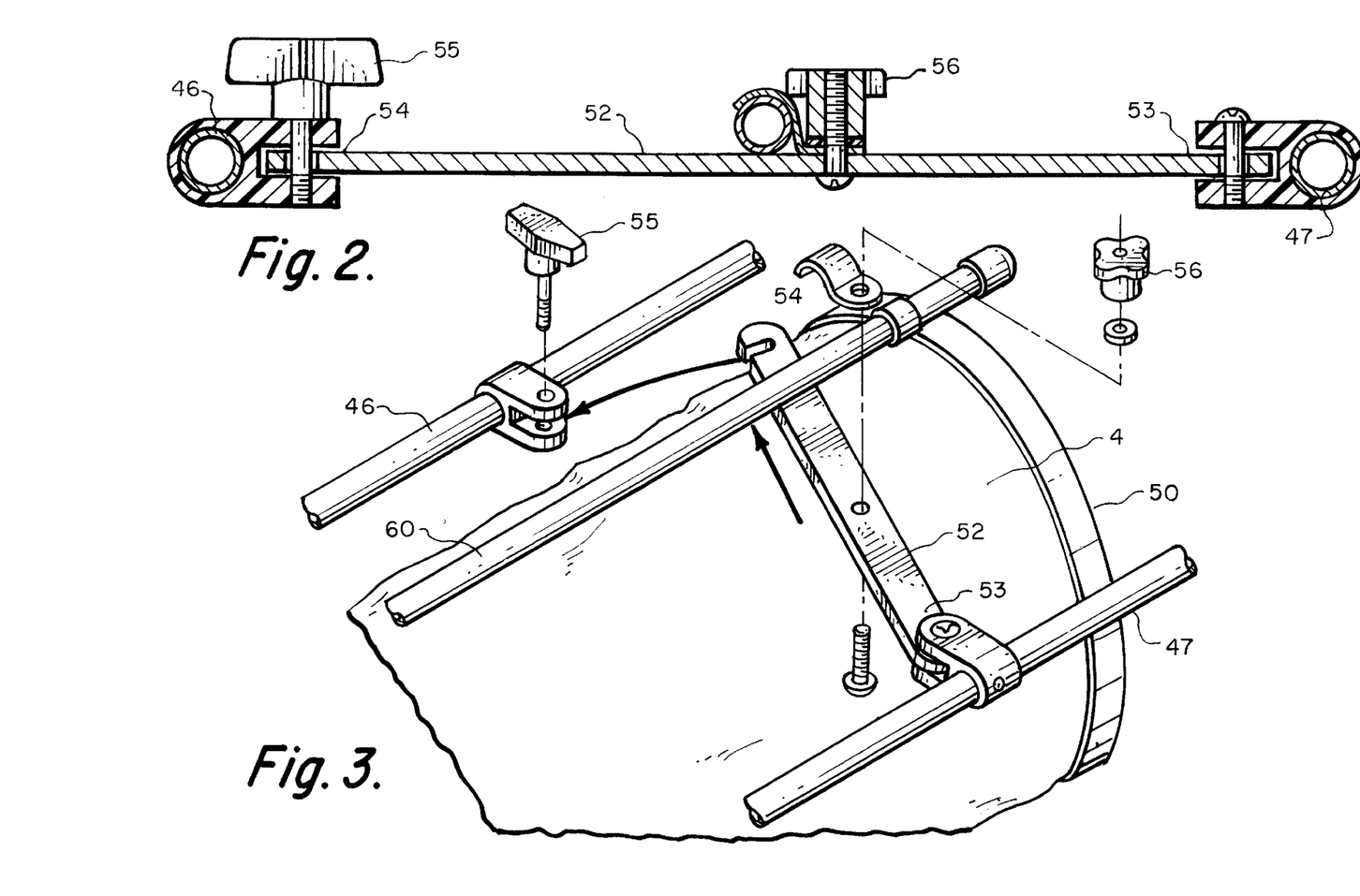
FIG. 2 is a cross-sectional view taken along line 2—2 of FIG. 1.
FIG. 3 shows the method of attaching a golf bag to the three wheeled version of the golf bag push cart.

In the this embodiment of the push cart 1 the means 29 for supporting the golf bag 4 suspends the golf bag 4 from the frame by securing its open end 50 and its bottom end 51 to the frame. Referring now to FIGS. 1 and 2, the means for supporting the open end 50 comprises a golf bag support member 52 having a pivot end 53 pivotably attached to the tublar frame member 47 and a removable end 54 attached to the tublar frame member 46 by means of a removable end clamping screw 55. A clasp assembly 56 attaches the golf bag 4 to the golf bag support member 52 as shown in FIGS. 2 and 3.

For the initial setup of the golf cart 1, the removable end clamping screw 55 is loosened, the support member 52 is pivoted away from the handle bar assembly 6 and slipped under longitudinal suspension member 60 attached to the golf bag 4. The support member 52 is then pivoted back to its original position and the removable end clamping screw 55 is tightened by hand. Subsequently the open end of the golf bag 50 is secured to the cart 1 by tightening the clasp assembly 56 over the longitudinal suspension member 60.

Other suitable alternatives for securing the ends of the golf bag are readily apparent for the purposes of this invention. A few examples include straps with buckles, straps and elastic ("shock") cords with cooperating hook fasteners, various latching mechanisms, and snaps and connecting rings. Typically these attachment means are chosen for compatibility with the particular type of golf bag selected for use with the cart.

Figure 4:
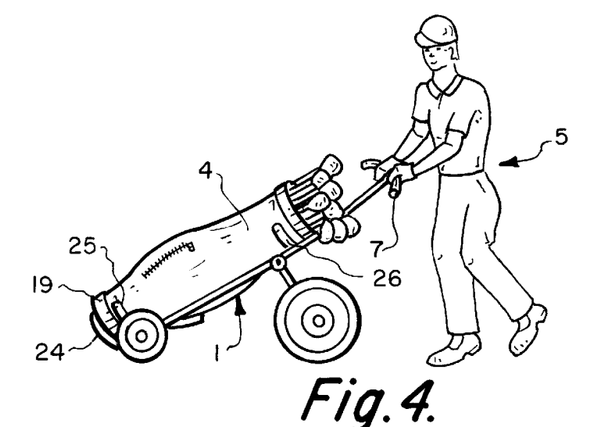
FIG. 4 is a schematic view of the pushable golf cart in use with the golf bag resting in the cart's cradles.
Figure 5:
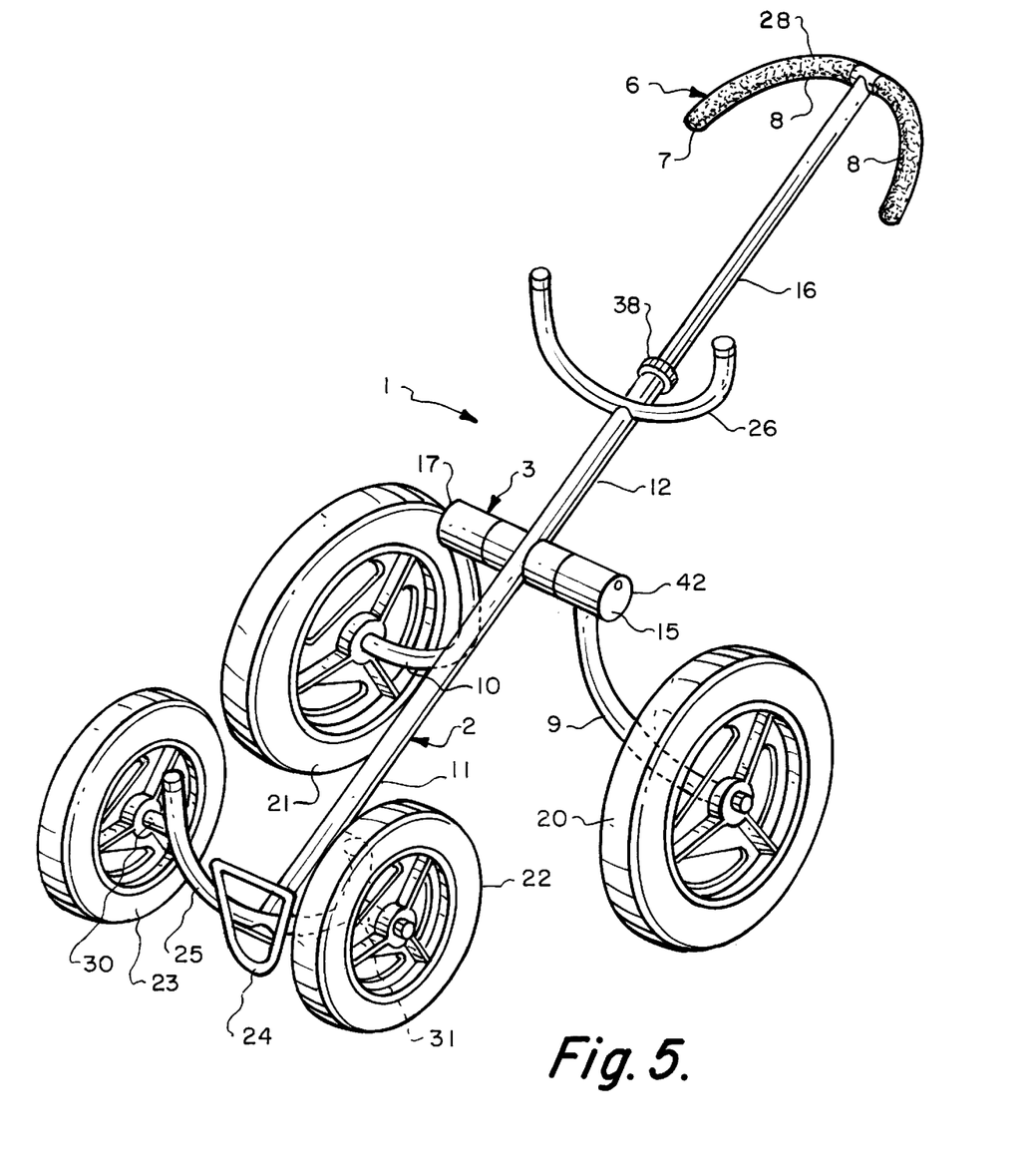
FIG. 5 is an isometric view of the pushable golf cart without the golf bag resting in the cart's cradles.

FIGS. 5–8 illustrate another embodiment of the invention. FIG. 4 shows the cart 1 and golf bag 4 being pushed by a golfer 5. Referring now to FIG. 5, the cart 1 comprises a frame 2 which has a lower and forward portion 11 and an upper and rearward portion 12. A base plate 24 and a lower cradle 25 are welded to the lower and forward portion 11 of the frame 2. An upper cradle 26 is welded to the upper and rearward portion 12 of the frame 2. Stub axles 30, 31 are welded to the lower cradle 25 and support rotating front wheels 22, 23. The upward and rearward portion 12 of frame 2 supports the rear axle assembly 3. The rear axle 33 has two ends 15, 17 with struts 9, 10 attached respectively to the ends 15, 17 of the rear axle 3. Rear wheels 20, 21 are also rotatably attached to the struts 9, 10. A handle assembly 6, includes a handle bar 7 and a rod 16 which can be telescopically attached to the frame 2. Knurled ring nut 38 secures the telescoping rod 16 to the frame 2. Handle bar 7 can be padded with a durable, resilient cover 28 and has a downwardly curved sections 8 to provide alternative positions for pushing the cart 1.

Continuing reference to FIGS. 4 and 5, a golf bag 4 is supported with the bottom 19 of the golf bag 4 resting against base plate 24 and supported in cradles 25, 26. The cradles 25, 26 are upwardly turned to support a broad variety and sizes of golf bags without the need to attach them to the cart 1.

Figure 6:
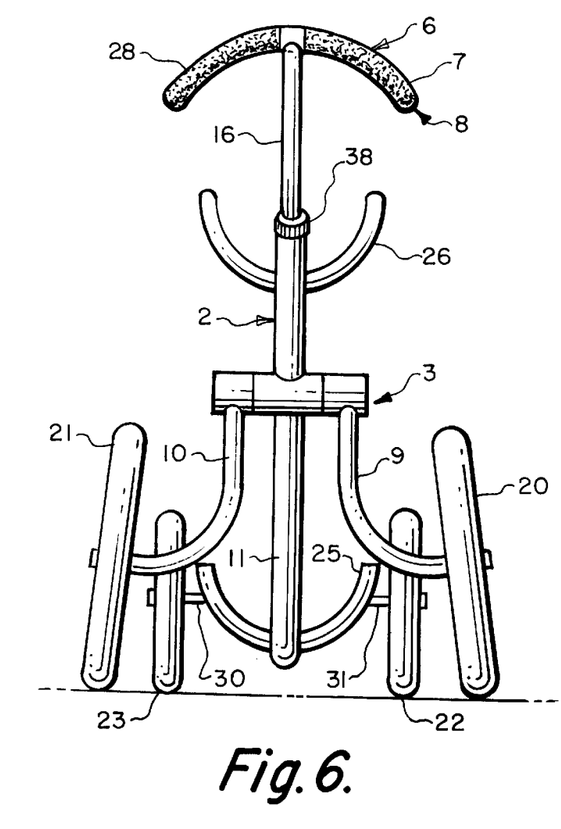
FIG. 6 is an end view of the cart depicting the spacing and camber of the wheels.

FIGS. 5 and 6 depict an embodiment of this invention fabricated from tubular structural material. For strength, economy, weight and manufacturablity considerations, the preferred material is aluminum. Other metals, synthetic plastic resins or composites are also suitable. In the presently conceived preferred embodiment of this invention, welded connections as described above are preferred but such connections may also be accomplished by any other well known attachment means, for example threaded connections, bolted flanges, appropriate adhesives and the like.

Also in the present embodiment, the aluminum structure is coated with a protective and appearance enhancing powdercoat finish. Alternatively, the structure may be left unfinished, or it may be painted or anodized.

FIG. 6 clearly shows the relative lateral spacing of the front wheels 22, 23 with respect to the more widely spaced rear wheels 20, 21. The camber of the rear wheels 20, 21 contributes to the overall stability of the cart 1.

Figure 7:
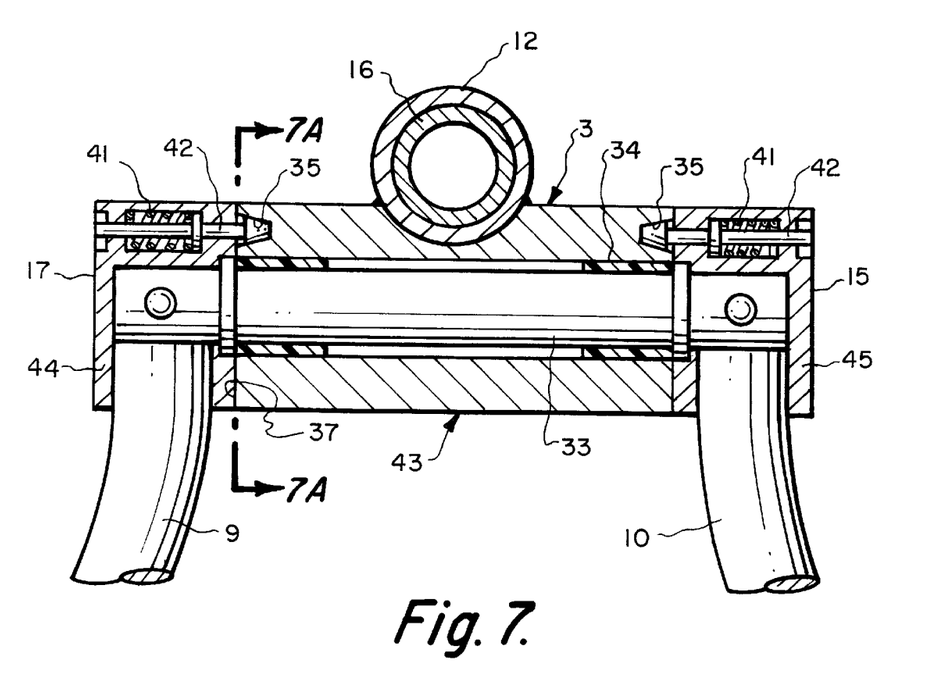
FIG. 7 is a detail of the rear axle assembly.
Figure 7A:
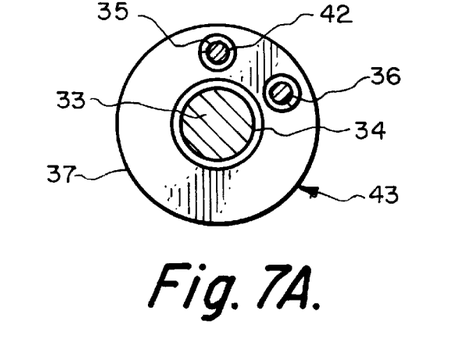
FIG. 7a is a cross-sectional view taken along line 7A—7A of FIG. 7.

FIG. 7 shows the rear axle assembly 3 with the interconnections of the struts 9, 10, the end caps 44, 45, the rear axle 33, and the spring loaded locking pin 42. End caps 44, 45 are rigidly and fixedly connected to rear axle 33 and struts 9, 10 are similarly attached to the end caps 44, 45. The struts 9, 10 are epoxy bonded to end caps 44, 45 which are pinned to the rear axle 33. Axle 33 is supported on nylon bushings 34 contained by housing 43. Two detents 35, 36 are angularly disposed about the axle 33 at one end 37 of housing 43 as shown in FIG. 7a. One end cap 44 contains the spring loaded locking pin 42 which engages detents 35 when the cart 1 is in its normal upright position to carry golf clubs. Detent 36 is engaged when the cart 1 is folded for storage and transport. In operation, the locking pin 42 is pulled by the golfer exerting only slight pressure to compress spring 41 and partially withdraw the locking pin 42 from either detent, 35, 36.

Figure 8:
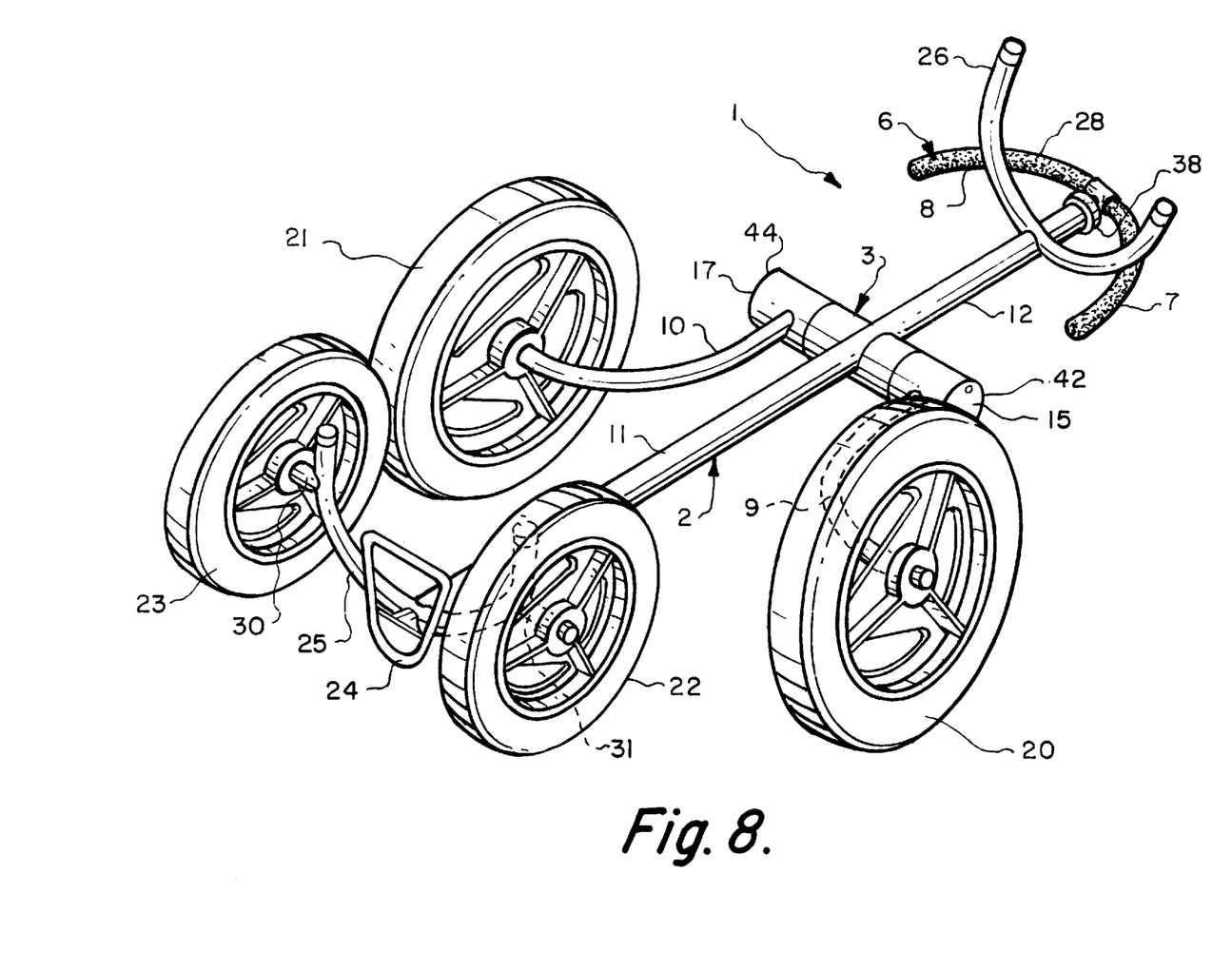
FIG. 8 is a schematic view showing the pushable cart in its folded position, golf bag removed.

FIG. 8 depicts the cart 1 after the locking pin 42 has been released allowing the cart 1 to fold and the knob 38 has been released to telescope rod 16 into the tublar frame 2 forming a more compact configuration for storage and transportation.

Figure 10:
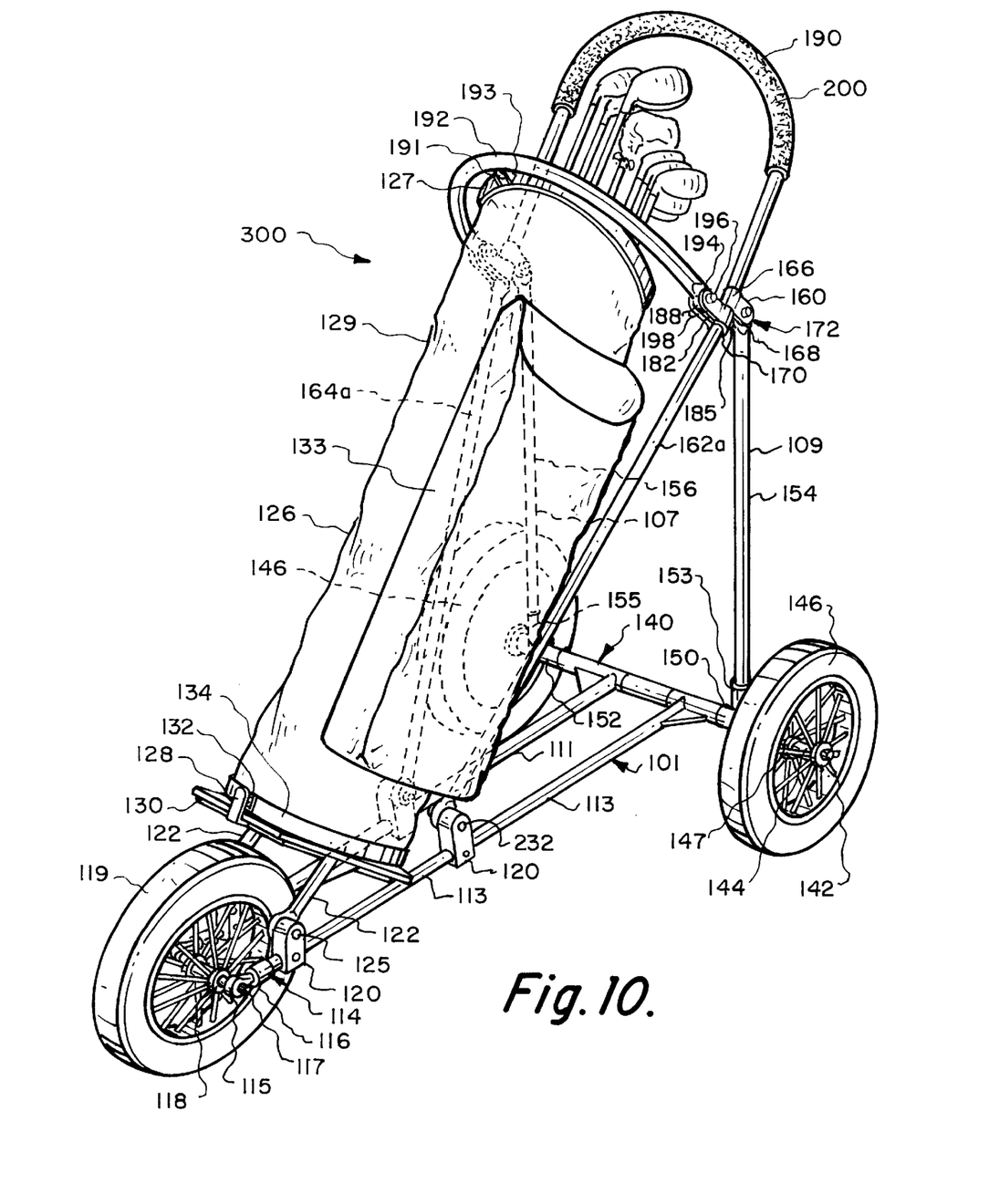
FIG. 10 is a front perspective view of a further embodiment of a golf push cart.
Figure 11:
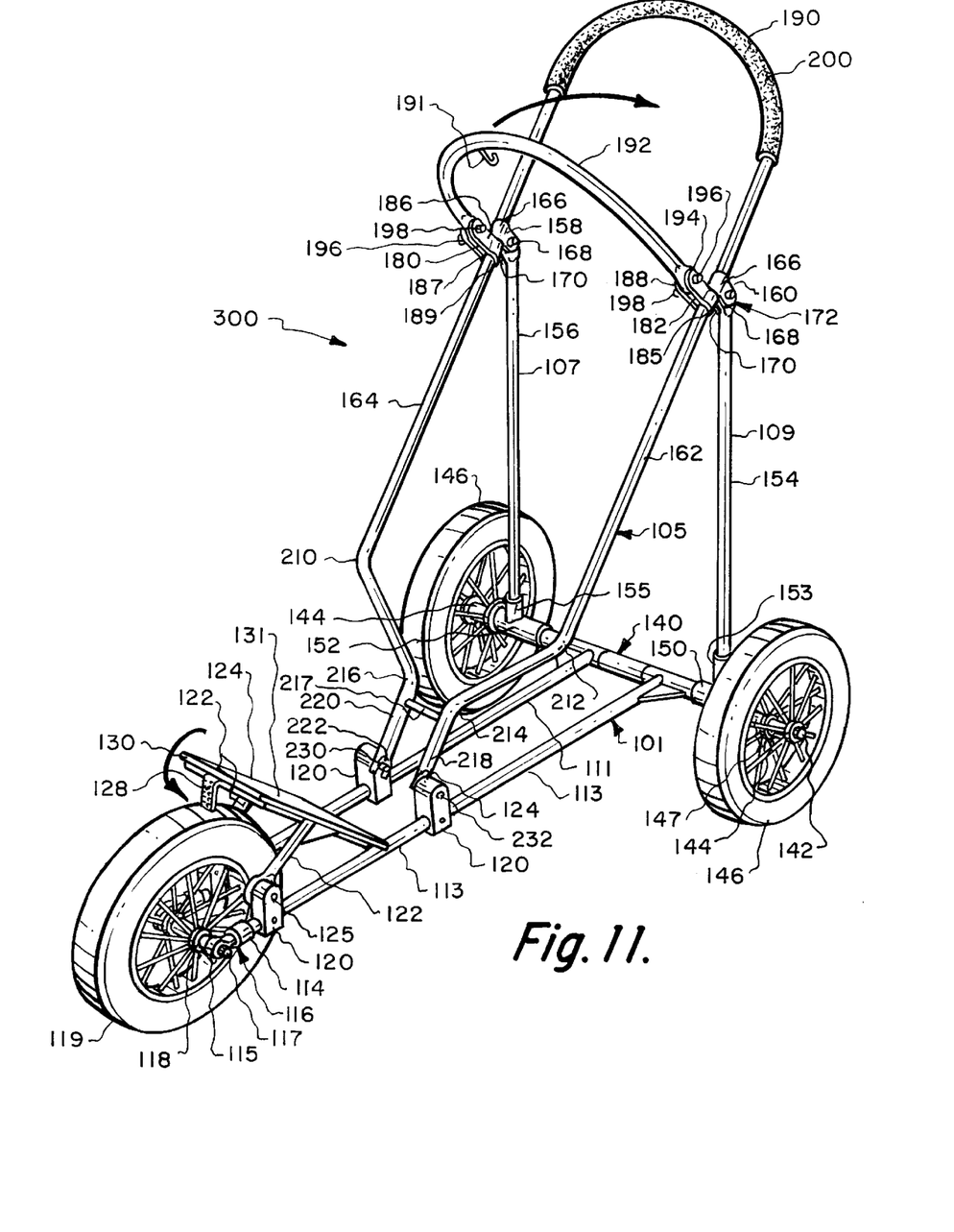
FIG. 11 is a perspective view of the golf push cart of FIG. 10 shown with the golf bag removed.

A further refinement of the design of a golf bag push cart is illustrated in FIGS. 10 and 11. The cart 300 is formed of a bottom frame 101, an elongated handle member 105 and upright support struts 107, 109. The bottom frame 101 comprises a set of parallel tubes 111, 113. A fitting 114 is attached to the front end 115 of each tube 108, 110. Each fitting 114 contains an aperture 116 for receiving the ends 117 of the axle 118 on the front wheel 119. A mounting block 120 is mounted on each tube 111, 113, just rearward of the front wheel axle 118. A set of arms 122 are rotably mounted on pin 125 and extend upwardly and rearwardly from each block 120. The upper end of the arm 122 is attached to a plate 124 for supporting the bottom of a golf bag 126. A strip 128 of hook-loop material such as Velcro® can be attached to the front edge 130 of the plate 124. The strip 128 can be attached to a patch 132 of hook-loop material mounted on the bottom band 134 of the bag 126. The front surface 131 of the plate 124 can be recessed at locations corresponding to studs or lugs, not shown, on the bottom surface of the bag 126. For visual purposes it is preferred that the plate have the same shape as the bottom of the bag, a bag with an oval cross-section is very attractive when used on the golf bag push cart of the invention. The bag 126 also contains an upper band 127. A tubular sleeve of fabric 129 is connected to the bands 127, 134. A pocket 133 can be attached to the sleeve 129.

The tubes 111, 113 also connect to a rear frame tubular member 140. The ends 142 of the rear member receive axles 144 on which are mounted wheels 146 secured to the axles by nut fasteners 148. Rotatable fittings 150, 152 are rotably mounted on the rear member 140 adjacent the inner wall 147 of the tires 146. Vertical tubular frame members 154, 156 are connected to sockets 153, 155 on the rotatable fittings 150, 152, respectively. The upper ends of the frame members 154, 156 are rotatably mounted on the handle tube members 162, 164 by means of a pin 168 held within the clamps 158, 160.

The clamps 158, 160 may be u-shaped having a curved section 166 receiving the tubes 162, 164 and a set of opposed walls having a aperture for receiving the pin 168. The upper ends of each of tube members 162, 164 also have an aperture. The end 170 of each tube member 162, 164 is placed into the clamps 158, 160 and the pin 168 is inserted through the aligned apertures in the clamp and the tube to form a pivoting connection 172.

A second set of brackets 180, 182 are attached to the handle tube members 162, 164 by means of clamps 185, 187 having a first curved section 184, 186 received on the tube member and an outer section 188, 190 containing an aperture. A curved tubular member 192 having a diameter larger than that of the upper band 127 of the bag 126 and preferably having the same radius as handle 190, is rotatably mounted by inserting an apertured end of the member 192 within each clamp 185, 187 with the aperture aligned with the clamp apertures and inserting a pin 194 through the apertures. The pin can be a bolt with a head 196 and a nut 198. A hook 191 can be mounted on the inside of curved member 192 for attachment to an eye 193 mounted on the upper band 127 of the golf bag 126. The upper ends of tube members 162, 164 are connected to a curved section 190 of tube, forming a handle which can be covered with a tube 206 of soft material such as synthetic rubber, foam or leather for comfort. All tubing can be a lightweight metal such as 7⁄8" diameter aluminum tubing.

The lower portion of the tubular members 162, 164 may have bends 210, 212 to reduce the spacing between them to less than the spacing between lower tubular frame members 111, 113. Each tube member 111, 113 contain a second bend 214, 216 such that the tubes form a straight section 218, 220 terminating in unshaped slots 222, 224. In a preferred embodiment, the tubes 162a, 164 are straight as shown in FIG. 11. A set of blocks 120 mounted on the tubes 111, 113 between the plate 124 and the rear tubular member 140 each have a pin 230, 232 for pivotally receiving the slots 222, 224.

The cart 300 is used by placing the bottom of a bag 126 on the plate 124 in alignment with depressions in the plate 124 and attaching the Velcro® strip 128 to the patch 132 on the bag. The hook 191 is then inserted through the eye 193 on the bag 126. When play is over, the bag 126 can be removed by separating strip 128 from the patch 132 and unhooking hook 191 from eye 193. Curved member 192 is rotated upwardly to rest on tubualar members 162, 164. The cart is then folded into storage configuration by lifting the slotted ends 222, 224 away from the pins 230, 232 and then pushing the handle 190 forwardly until the curved sections 214, 216 and brace 217 are forward of the front wheel 119. The curved members 214, 216 will rotate upwardly and the frame members 154, 156 will rotate downwardly to form a compact assembly. The assembly can be stored in a storage bag and readily carried from place to place.

The golf cart of the invention is easily stored by releasing and rotating the legs toward the frame. The ease of operation is due to the balance, stability and mobility of the cart. The cart can be pushed with the force from one finger. The cart turns very easily by lifting the front wheels and pivoting the cart on its rear wheels. A foot brake can be provided for use on grades.

With a balance point close to the back of the cart and the cart uniquely turns by lifting the front wheels and turning the cart in a tight circle.

The static weight of the cart and golf bag with clubs is extremely high, about 20 pounds. Therefore, the energy to push the cart is very small. The handlebar height and the angle of the frame are high enough that the arms of the golfer are positioned in an extended attitude—like a stiff-arm— using the leverage of the arms in an ergonomic, comfortable position. The stability and low weight center of gravity enables the user to allow the cart to roll unassisted on down hill grades with an occasional push from time to time. The effect is that the golfer has the feeling of walking without encumbrance. The preferred cart with tubular construction with 2 bag cradles, curved handlebar and shape of the frame is very attractive—looking like a racing bike.

The man powered push cart of the invention is moved by using your arms in an extended position. Because it rolls on 3 wheels, it moves easily with very little effort. The wheels are preferably the same diameter, suitably about 12 inches in diameter. Down grades it rolls by itself. The body is never being strained and always stays upright whether moving or standing still. The golf clubs lie in the cart at a favorable angle which makes them easy to see and select. The balance position of the golf bag is always over the main 2 rear wheels with the third wheel in front of the cart allowing the cart to turn within its own way. The bag is a modern soft top design with pockets for storage and can be easily removed from the cart frame by undoing a Velcro® strap at the bottom and simply lifting the bag away from the frame. The look is a racy machine something between a bicycle and a baby jogger. The push cart can be folded into a flat configuration and carried in a flat compact carrying bag.

It is to be realized that only preferred embodiments of this invention have been described, and that numerous substitutions, modifications, alterations, and applications are permissible without departing from the spirit and scope of the invention as defined in the following claims.

What is claimed is:

1. a golf bag push cart comprising in combination:

a front axle;

at least one wheel rotatably mounted on the front axle, said front axle having a first width;

a rear axle having outer ends;

a wheel rotatably mounted on each outer end of the rear axle, said rear axle having a width greater than the first width;

a first frame member having a front end connected to the front axle and a rear end connected to the rear axle joining said axles so that the wheels are disposed in a common plane;

an inclined frame member having a lower forward end and an upper rearward end;

a first connector joining the lower forward end to the front end of the frame member;

a second connector joining the upper rearward end to the rear end of the frame which on said inclined frame member means for supporting a golf bag; and a handle assembly including a handle bar connected to the upper rearward end of the inclined frame member with the handle bar disposed to the rear of the rear axle.

2. A golf bag push cart according to claim 1 wherein said means for supporting a golf bag comprises an arcuate member connected to the inclined frame member near the upper rearward end thereof having means for releasably engaging a golf bag such that at least a portion of the golf bag is positioned above said inclined frame member.

3. A golf bag push cart according to claim 2 wherein said front axle has a single wheel.

4. A golf bag push cart according to claim 3 wherein said rear axle has two wheels, said rear axle mounted transversely to said first frame member.

5. A golf bag push cart according to claim 1 wherein said means for supporting a golf bag comprises at least one cradle member connected to said inclined frame member whereby the golf bag is supported above said inclined frame member.

6. A golf bag push cart according to claim 1 wherein said means for supporting a golf bag comprises a base plate, connected to said inclined frame member near the lower forward end thereof.

7. A golf bag push cart according to claim 1 wherein said handle assembly is adjustably and telescopically attached to the upper and rearward end of inclined said frame member whereby the handle bar may be optimally positioned by the golfer for pushing the cart.

8. A golf bag push cart according to claim 7 wherein the handle assembly includes a rod and the handle bar is attached transversely to said rod and the handle bar is forwardly curved whereby the cart may be pushed from behind and from either side.

9. A golf bag push cart according to claim 1 wherein said frame members and said handle bar are comprised of tubular structural sections.

10. A golf bag push cart according to claim 9 wherein the tubular structural sections are formed from aluminum.

11. A golf push cart having a front end and a rear end comprising in combination:

a rearwardly and upwardly inclined frame member having a lower and forward portion disposed near said front end, an upper and rearward portion disposed near said rear end, a forwardly inclined base plate, a lower golf bag cradle attached to the lower and forward portion and an upper golf bag cradle attached to the upper and rearward portion of said inclined frame member a base frame member having a forward end and a rearward end;

a front axle having a first width and having at least one rotatable front wheel, connected thereto said front axle being connected to the forward end of said base frame member;

a rear axle assembly including a rear axle having a width larger than said first width and having outer ends, said rear axle having a wheel rotatably connected to each outer end upper and rearward portion of said rear axle; and a handle assembly having a handle bar attached to the rearward and upper portion of the inclined frame member rearward of said rear axle where said cart is pushed by the golfer.

12. A pushable golf bag cart comprising in combination:
a push cart according to claim 1; and
a golf bag attached to said cart.

13. A golf bag push cart comprising:

a rearwardly and upwardly inclined frame having a lower and forward portion, an upper and rearward portion, and a forward end and a rear end;

a bottom frame having a forward end and a rear end;

at least one axle having a rotatable front wheel, connected to the forward end of the bottom frame;

the rear end of the bottom frame being connected to a transverse member having a first end and a second end;

a rear axle connected to the first and second ends of the transverse member;

a wheel rotatably mounted on each of said rear axles;

a pair of upstanding struts each having a lower end rotatably mounted on said transverse member and an upper end pivotally connected to said inclined frame;

a bag support member connected to the upper portion of the inclined frame having a means for releasably attaching to a golf bag;

handlebar means attached to the first ends of said inclined frame; and means pivotally connecting the second end of the inclined frame to the bottom frame.

14. A golf bag push cart according to claim 13 in which the bag support member is an arcuate member.

15. A golf bag push cart according to claim 14 in which the golf bag has an upper end, the upper end includes a fastening element and the arcuate member contains a cooperating fastening element.

16. A golf bag push cart according to claim 13 further including a plate for supporting the bottom of the bag mounted on said bottom frame.

17. A golf bag push cart according to claim 16 in which the plate contains a strap for releasably adhering to the bottom of said bag.

18. A golf bag push cart according to claim 16 in which the plate is pivotally mounted on said bottom frame.

19. A golf bag push cart according to claim 13 in which the upper rear end of the inclined frame is attached to a handlebar.

20. A method of transporting a golf bag across terrain comprising the steps of:

securing the bag to a push cart, said cart comprising an inclined frame having a first lower forward end, an upper rearward end, a lower frame having a front end and a rear end, the upper end of the inclined frame being connected to a handlebar;

the lower end of the inclined frame being pivotally connected to the lower frame;

the lower frame containing a rear transverse member;

struts rotatably mounted on said transverse member and having a second end pivotally connected to said inclined frame;

means for releasably securing the bag to said inclined frame;

a front wheel rotatably mounted on the front end of the bottom frame;

a set of rear wheels being rotatably mounted on the rear end of said bottom frame; and manually pushing the handlebar to transport the cart and bag across terrain.

21. A golf bag push cart according to claim 1 in which said first frame member includes said inclined frame member.

* * * * *